Fig. I.
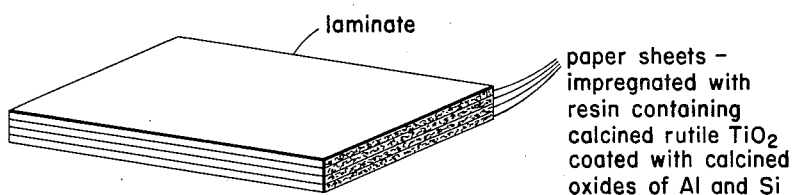
laminate
paper sheets – impregnated with resin containing calcined rutile $TiO_2$ coated with calcined oxides of Al and Si
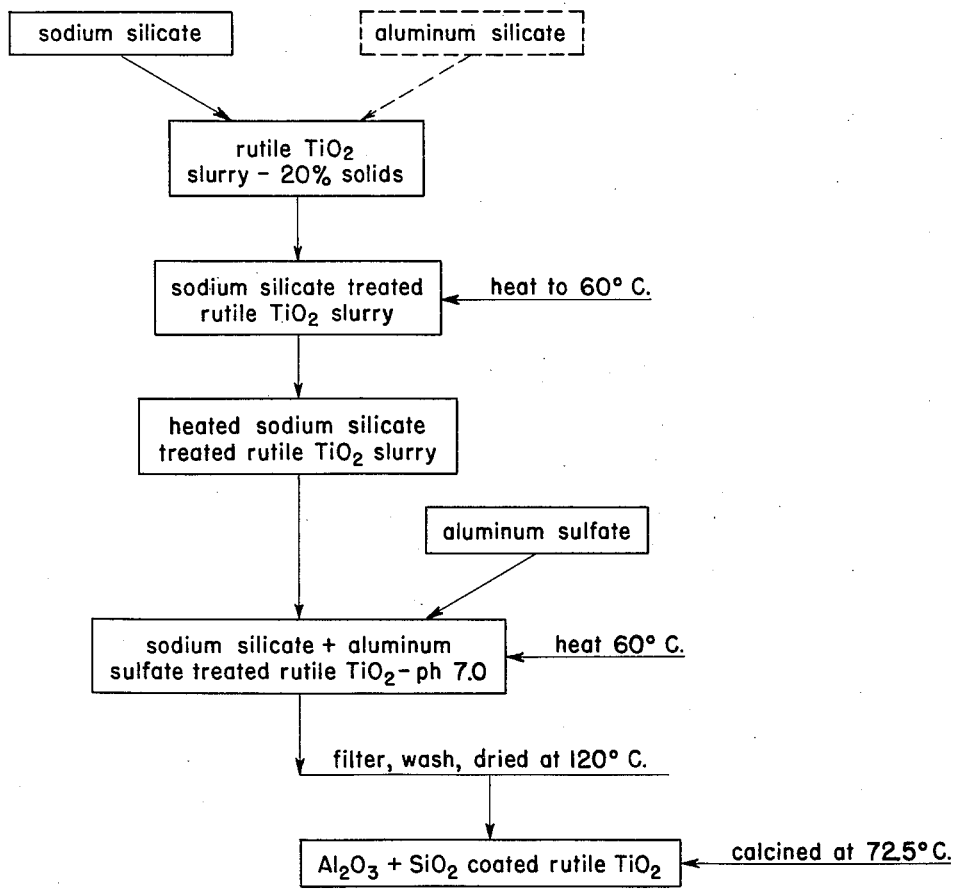
Fig. 2.
INVENTOR
Walter T. Siuta
BY
*Harold L. Gammons*
AGENT United States Patent Office 3,035,966
Patented May 22, 1962

3,035,966
PROCESS OF PRODUCING PAPER LAMINATES, PIGMENTED RESINOUS COMPOSITION AND PROCESS OF PREPARING SAME
Walter T. Siuta, Metuchen, N.J., assignor to National Lead Company, New York, N.Y., a corporation of New Jersey
Filed Jan. 15, 1958, Ser. No. 708,988
9 Claims. (Cl. 162—166)

The present invention relates in general to pigmented resinous materials and more especially to laminates which are resistant to discoloration.

Industrial applications of resins and in particular melamine formaldehyde, urea formaldehyde, phenol formaldehyde and the like are extensive, particularly as coating compositions and as used in molded articles. An especially wide application of these resins has been made in the field of laminates by which is meant products in which a resin acts not only as an adhesive to hold together layers or masses of such materials as wood, glass-fiber and paper but also to impart strength and durability to the finished product. One of the most familiar applications of laminates is that of flat sheets used for counter tops, shelving and panelling, although formed products such as tubing, helmets and the like are currently produced by high-pressure laminating process. Colored laminates are increasingly popular and in general are produced by impregnating a resinous material with a coloring agent such as an opaque pigmentary material. A typical opaque pigment used for this purpose is titanium dioxide of the rutile modification. However, while this pigmenting material is ideal as an opacifying agent it has been found that when this pigment is used in resinous materials and in particular laminates, the latter will discolor when exposed to sunlight.

An object, therefore, of the present invention is to provide a pigmented resinous material which is resistant to discoloration when exposed to sunlight.

A further object of the invention is to provide an improved process for forming opacified laminates wherein the pigment used to opacify the resin is resistant to discoloration when exposed to ultraviolet light.

A still further object of the invention is to prepare a pigmented laminate resistant to discoloration by pigmenting the laminate with a silica-alumina coated titanium dioxide pigment of the rutile modification.

A still further object of the invention is to coat calcined $TiO_2$ of the rutile modification with a silica-alumina complex, and heat the pigment to at least partially dehydrate the complex coating.

These and other objects, features and advantages of the invention will be described in more detail in the specification which follows.

Broadly, the instant invention relates to an improved method for producing pigmented resinous materials which will be resistant to discoloration upon exposure to ultraviolet light by incorporating in the resinous materials at titanium dioxide pigment which has been prepared by treating a calcined $TiO_2$ pigment of the rutile modification with the hydrous oxides of silicon and aluminum and calcining the treated pigment to at least partially dehydrate the hydrous oxides.

As explained hereinafter the hydrous oxides used to coat the calcined rutile $TiO_2$ pigment are those of silicon and aluminum, and these may be precipitated onto the pigment successively or simultaneously. In the latter instance, the respective oxides may be used in stoichiometric proportions such as to form hydrous aluminum silicate, the term "hydrous oxide coating" as used herein being comprehensive of an admixture of silica and alumina or a coating of hydrous aluminum silicate.

A specific application of the invention is in the field of laminates and in particular paper laminates which are opacified by the use of $TiO_2$ pigment; and for purposes of illustration the description which follows will relate specifically to the use of the aforesaid oxide coated titanium dioxide pigments in the production of paper laminates. It will be understood however that the invention is not limited to the preparation of paper laminates but is comprehensive of laminates formed with other carrier mediums, as for example, cellulosic fibers, glass fibers, fabrics, wood products, and the like; as well as pigmented resinous materials in the form of massive molded products.

Heretofore it has been the practice in the manufacture of paper laminates to pigment the laminates with opacifying agents such as zinc sulfide or titanium dioxide and in particular $TiO_2$ of the rutile modification which because of its high hiding power and brightness is ideally suited as an opacifying agent. However, the advantages of the rutile $TiO_2$ pigment are more than offset by the effect of light and in particular ultraviolet light on the pigmented laminates which, when exposed to ultraviolet light, will discolor. This discoloration is actually a graying of the pigmented laminate and may be severe enough to actually take on a blue cast. Depending upon the length of exposure and the intensity of the ultraviolet light, discoloration may be temporary or permanent but in any event is a serious detriment to the commercial acceptance of rutile pigmented laminates.

The instant invention is characterized by the discovery that an oxide coated $TiO_2$ pigment and in particular a calcined $TiO_2$ pigment of the rutile modification treated with the hydrous oxides of silicon and aluminum and calcined at a temperature at least sufficiently high to partially dehydrate the hydrous oxide coating will have the brightness and hiding power desired for use in paper laminates and that paper laminates opacified with this oxide coated rutile pigment will resist discoloration when exposed to ultraviolet light.

It is significant that an uncoated calcined $TiO_2$ pigment of the rutile modification or a calcined rutile $TiO_2$ pigment coated with titania, silica or alumina alone; or with the combination of titania and silica; or titania, silica and alumina, and subsequently calcined, will have relatively high discoloration ratings when exposed to ultraviolet light as compared to the discoloration ratings of a calcined rutile $TiO_2$ pigment coated with the oxides of aluminum and silicon and calcined to at least partially dehydrate the oxides.

FIG. 1 of the drawing represents the article while FIG. 2 is a flow diagram of the process.

As shown by the following examples the requisite oxides of aluminum and silicon may be applied to the $TiO_2$ pigment in any conventional manner, for example, treatment solutions of silica and alumina may be added successively or simultaneously to a slurry of the $TiO_2$ pigment. It is essential, moreover, that after formation of the hydrous oxides the oxide coated pigment be dried and subsequently baked or calcined at a temperature sufficient to at least partially dehydrate the hydrous oxide coatings, the preferred calcination treatment being that of heating the oxide coated pigment from one to three hours at temperatures within the range of from 650 to 800° C.

OXIDE COATED PIGMENTS

The preparation of an oxide coated rutile $TiO_2$ pigment which will be resistant to discoloration when exposed to ultraviolet light may be carried out by any one of the several methods described below each of which provides an oxide coated pigment ideally suited for use in paper laminates and similar resinous materials.

These methods illustrate what has been discovered to be the preferred way of preparing an oxide coated pigment suitable for use in paper laminates and similar resinous materials, and are characterized by admixing an aqueous slurry of the $TiO_2$ pigment with aqueous solutions of ionizable aluminum and silicon compounds, said ionizable compounds being added in a ratio and amounts such that the hydrous oxides of aluminum and silicon are in the mole ratio of 1:1 and in an amout comprising about 6% by weight of the $TiO_2$ pigment. It will be understood however, as seen from additional data set out below, that the mole ratios of alumina and silica may vary from 1:1 to 2:1, and that the amounts may vary from 2 to 15% by weight of the $TiO_2$.

*Pigment A*

By way of example, aqueous solutions of sodium silicate and aluminum sulfate were added successively to an aqueous slurry of classified, calcined rutile $TiO_2$ pigment. Thus a classified rutile titanium dioxide slurry containing 400 gm. of $TiO_2$ at 20 percent solids was treated with 159 ml. of sodium silicate solution containing 11.7 gm. of NaOH and 8.8 gm. $SiO_2$. The batch was heated to 60° C. Then 152 ml. of an aluminum sulfate solution (equivalent to 15.2 gm. of alumina and 43.6 gm. of sulfuric acid) was added to the slurry. The batch was neutralized to a pH of 7.0 with 117 ml. of sodium hydroxide solution containing 24.2 gm. of NaOH to form and precipitate a coating of the hydrous oxides of aluminum and silicon on the $TiO_2$. The quantity of coating, calculated to give a 1:1 $Al_2O_3$ to $SiO_2$ mole ratio product, i.e. 3.8% $Al_2O_3$ and 2.2% $SiO_2$ after calcination, was 6 percent of the weight of the titanium dioxide. The $H_2SO_4$/NaOH ratio was 1.21 compared to a theoretical of 1.23. The hydrous oxide coated pigment was further heated for one hour at 60° C., filtered, washed relatively salt free with water, and dried at 120° C. It was then calcined at 725° C. and then dry milled and pulverized.

*Pigment B*

A modification of the above procedure is one wherein the sodium silicate solution was alkalinized prior to its addition to the pigment slurry. Thus to a hydroclassified slurry containing 400 grams calcined rutile $TiO_2$ at 20% solids was added 151 ml. of an alkalinized sodium silicate solution consisting of 11.7 grams sodium hydroxide, 8.8 grams $SiO_2$ and 106 ml. of an aqueous solution of NaOH containing 21.9 grams NaOH. The alkalinized slurry was stirred fifteen minutes for uniformity and then heated to 60° C. Thereupon 152 ml. of an aqueous solution of aluminum sulfate consisting of 15.2 grams $Al_2O_3$ and an equivalent of 43.6 grams $H_2SO_4$ were added to the alkalinized slurry to precipitate an aluminum silicate gel at a pH of about 4.6. The ratio of $H_2SO_4$ to NaOH was about 1.3 as compared to a theoretical ratio of 1.23. This slurry comprising the calcined rutile $TiO_2$ pigment coated with hydrous aluminum silicate gel was stirred for one hour at 60° C., and filtered. The filter cake was washed with water to remove soluble salts, dried and calcined at 725° C. after which it was chaser milled and micropulverized.

*Pigment C*

It has also been found that a highly satisfactory pigment for use in paper laminates may be prepared by the simultaneous addition of aqueous solutions of alkalinized sodium silicate and aluminum sulfate to the $TiO_2$ pigment slurry. Thus a classified rutile $TiO_2$ pigment slurry at 20.6% solids (600 grams $TiO_2$) was heated to 60° C. and to this aqueous slurry was added an aqueous solution comprising 477 ml. of sodium silicate and sodium hydroxide; and a 456 ml. solution of aluminum sulfate. These aqueous solutions were equivalent in composition to 6% anhydrous aluminum silicate on a $TiO_2$ weight basis and when added to the $TiO_2$ pigment slurry the mole ratio of the oxides of aluminum and silicon was 1:1 and the pH of the slurry was 7.2.

Specifically, the alkalinized silicate mixture comprised 293 ml. of sodium metasilicate solution consisting of 17.6 grams of sodium hydroxide and 13.2 grams of $SiO_2$; and 184 ml. of a 200 gm./lit. solution of sodium hydroxide (36.8 gm. sodium hydroxide) for a total of 54.4 grams sodium hydroxide in the alkalinized silicate mixture. The aluminum sulfate solution at 50 gm./lit. $Al_2O_3$ contained 22.8 grams $Al_2O_3$ and 65.5 grams $H_2SO_4$ and was equal to 456 ml. The ratio of $H_2SO_4$ to sodium hydroxide was 1.2 compared with the theoretical ratio of 1.23.

The simultaneous addition of these aqueous solutions to the pigment slurry was made over a period of 15 minutes with the pH maintained within the range of from 6.5 to 7.5. The hydrous aluminum silicate-$TiO_2$ slurry was heated an additional one-half hour at 60° C., filtered, washed with water, preferably de-ionized water, to remove the soluble salts, calcined at 725° C., milled and pulverized.

The binary system referred to as aluminum silicate forms two compounds, the one being sillimanite ($Al_2O_3.SiO_2$) which, during calcination of the alumina-silica system can be detected by X-ray defraction patterns at 1000° C.; the other, mullite ($3Al_2O_3.2SiO_2$) which is formed by the decomposition of sillimanite at temperatures of 1550° C. It is postulated that the silica-alumina complex formed by adding the sodium silicate and aluminum sulfate solutions to the pigment slurry is an amorphous form of sillimanite which, if calcined to a temperature of 1000° C., will produce sillimanite crystals.

Aluminum compounds which have been found satisfactory for the purpose of this invention include aluminum sulfate, aluminum nitrate, aluminum chloride and similar ionizable aluminum salts as well as various aluminates including sodium aluminate, potassium aluminate and the like. Since the aluminates are highly alkaline, it will be necessary in such cases to acidify the slurry to a pH of 7.0 after pigment treatment.

The hydrous silica may be derived from any soluble silicate such as for example sodium, potassium or ammonium silicates. However, for reasons of economy and availability sodium silicate and preferably sodium meta silicate ($Na_2O.SiO_2$) is used.

It should be noted that in each of the procedures described above for making silica-alumina coated pigments the silicate solution is added before the aluminum compounds. This order of addition is preferred since the silicate solution serves to disperse the $TiO_2$ in the slurry so that when the aluminum compound is added the precipitated alumina and silica, or aluminum silicate, as the case may be, coats an optimum number of discreet $TiO_2$ particles. Moreover, by adding the aluminum compound last it serves to coagulate the $TiO_2$ slurry and hence facilitates filtering and washing the coated pigment.

As shown by the pigment types described herein the amount of anhydrous alumina calculated as $Al_2O_3$ used to coat the $TiO_2$ pigment may vary from 3 to 7% but is preferably about 4% based on the weight of the $TiO_2$ pigment while the amount of silica calculated as $SiO_2$ may vary from 1 to 4% but is preferably about 2% based on the weight of the $TiO_2$ pigment.

PAPER LAMINATES

There are at least two ways in which the preparation of pigmented resinous materials and in particular opacified paper laminates by the method of this invention may be carried out, the one method being that wherein paper laminates are prepared by impregnating a finished paper with a slurry comprising the aforesaid oxide coated pigment and a resin in a solution of water and alcohol. After the impregnated paper has been dried a plurality of sheets of impregnated paper are superposed and formed into an opacified paper laminate by well-known hot pressing techniques.

As an alternative method of preparing an opacified paper laminate the aforesaid oxide coated pigment may be added to the paper stock used in the manufacture of the paper. The finished pigmented paper is then impregnated with an alcohol-water solution of the resin, after which a plurality of sheets of the pigmented, resin-impregnated paper are laminated by hot pressing techniques. It has been found that laminates prepared in this manner will have discoloration rates generally lower than laminates prepared by impregnating a finished paper.

DISCOLORATION TEST

In order to determine the discoloration suffered by paper laminates opacified with an oxide coated $TiO_2$ pigment prepared as hereinabove described a test was devised as a standard for measuring the discoloration of a pigmented paper laminate when exposed to ultraviolet light. This test was carried out using a standard Hunter Multi-purpose Reflectometer and a battery of type RS reflector sunlamps. The latter were arranged circumferentially in groups of three approximately 5 inches above the top of a turntable which was rotated at a speed of 3 revolutions per minute. The specimen laminates to be evaluated were first tested for blue, green and amber reflectance values using the Hunter Multi-purpose Reflectometer. Thereafter the test laminates were placed on the turntable beneath the bank of sunlamps and rotated for a period of 16 hours. The temperature at the surface of the turntable was maintained between 65 and 80° C.

After exposure for the aforesaid length of time the blue, green and amber reflectance values of the exposed laminates were determined. Using these two sets of readings the average total discoloration in percent is determined by the formula:

$$D = \frac{b+g+a}{3}$$

where D is the average percentage discoloration and $b$, $g$ and $a$ are the changes in blue, green and amber readings in percentage after exposure.

It has been found by experiment that a 3 percent or lower discoloration rating is satisfactory since at this level it is virtually impossible to detect color differences by the naked eye. A percent discoloration rating of 5 is permissible as the upper limit which, as shown hereinafter, is considerably below the percent discoloration ratings of uncalcined oxide coated pigments now in use.

To further illustrate the invention the following example is given:

EXAMPLE I 60 ml. of de-ionized water were mixed with 51 ml. of filtered denatured alcohol and 100 grams of a commercial grade melamine formaldehyde resin for 30 seconds in a covered Waring Blendor. To this mixture was added 25 grams of Pigment A and the mixture was stirred for an additional 10 minutes. The resulting slurry was then poured into a 250 ml. container. Four strips of filter paper (similar to Whatman No. 3) measuring 2.5 x 5.5 inches were dipped successively into the slurry. The excess slurry was removed from the slips of paper by drawing each slip of paper first one side and then the other over a ¼ inch glass rod. Thereafter the saturated strips of paper were hung from a wire rack and the rack was transferred to an oven preheated to 140° C. in which the saturated strips of paper were cured for 20 minutes. The four strips of cured paper were then stacked one on top of the other and the stack placed between two chromium-plated, steel plates. The stack of saturated paper strips was then pressed in a preheated press at 1500 p.s.i. for 13 minutes at a temperature of 149° C. Thereafter the heat was shut off, the plates cooled below 50° C. with cold water while maintaining the pressure constant during the cooling period. The press was then opened and the laminate removed.

The laminate prepared in the manner described above was then tested for color degradation by first obtaining the blue, green and amber reflectance values of the laminate using the Hunter Multi-purpose Reflectometer. Thereafter, the laminate was placed on the turntable directly beneath the battery of sunlamps. A thermometer was placed on the turntable for reading the temperature at the surface of the turntable and the latter rotated for a period of 16 hours. At the end of this time, the laminate was removed from the turntable and the blue, green and amber reflectance values of the exposed portion of the laminate were redetermined using the Hunter Reflectometer. The average total discoloration in percentage was then calculated using the formula set out above. For the specimen laminate prepared by Example I the percent discoloration was 3.8.

A series of additional laminates were prepared in the manner set forth in Example I using coated pigments of type A, B and C, respectively, and melamine formaldehyde resin, with one exception, in which a urea formaldehyde resin was used with Pigment A. Each of these laminates was exposed to ultraviolet light in the manner described in Example I to determine the discoloration ratings.

It will be seen from Table I below that the laminates employing pigments A, B and C coated with calcined alumina and silica have lower discoloration ratings than laminates employing pigments having a coating of uncalcined alumina and silica; and that laminates prepared from urea resin have somewhat lower discoloration ratings than those prepared from melamine resin. The figures in the extreme righthand column show the highly inferior discoloration ratings of pigments having uncalcined oxide coatings.

TABLE I $Al_2O_3$—$SiO_2$ COATED $TiO_2$ IN PAPER LAMINATES

| Pigment Type | Resin | Percent Discoloration—D | | | |
|---|---|---|---|---|---|
| | | Calcined | | | Uncalcined |
| | | 700° C. | 725° C. | 800° C. | |
| A ($SiO_2+Al_2O_3$) | Melamine | 4.4 | 3.8 | 3.4 | 10.1 |
| A ($SiO_2+Al_2O_3$) | Urea | 2.3 | | 1.4 | 9.3 |
| B ($Al_2O_3.SiO_2$) | Melamine | 4.2 | | | 9.0 |
| C ($Al_2O_3.SiO_2$) | Melamine | 3.3 | | | 11.8 |

As pointed out above all of the calcined silica-alumina coatings referred to above have been in a 1:1 mole ratio of $Al_2O_3$ to $SiO_2$ and in an amount of 6% by weight of the $TiO_2$ pigment. However, these factors are illustrative only of a preferred method of carrying out the invention and are not limitative. Other laminates were prepared in the manner of Example I except that the amounts of silica and alumina were varied. Thus using a rutile $TiO_2$ pigment having a calcined coating of alumina and silica in the mole ratio of 1:1 but varying in amounts from 2 to 15% by weight of $TiO_2$, the following discoloration ratings were measured on melamine resin laminates.

TABLE II $TiO_2$ COATED WITH 1:1 $SiO_2$—$Al_2O_3$ MOLE RATIO

| Coating (percent) on $TiO_2$ basis | Percent Discoloration—D (melamine resin) | | | | |
|---|---|---|---|---|---|
| | 2 | 3 | 6 | 10 | 15 |
| Temperature: | | | | | |
| Uncalcined | 11.0 | 9.8 | 8.4 | 8.2 | 8.5 |
| 650° C | 7.0 | 5.1 | 3.8 | 4.0 | 3.4 |
| 700° C | 6.4 | 5.0 | 3.1 | 3.5 | 3.5 |
| 750° C | 5.2 | 4.6 | 3.6 | 4.3 | 4.4 |

It is evident that laminates having calcined coatings of alumina and silica in the range of from 2 to 3% by weight $TiO_2$ have higher discoloration ratings than laminates opacified with the higher amounts of alumina and silica coated $TiO_2$; and that in all cases the discoloration ratings of laminates opacified with uncalcined coatings of alumina and silica are much higher than those of the calcined coatings.

Additional discoloration ratings were made on melamine resin laminates prepared as in Example I except that the mole ratio of $Al_2O_3$ and $SiO_2$ was varied for a given percentage of the oxide coating on a $TiO_2$ weight basis. The discoloration ratings are listed in Table III below.

TABLE III $TiO_2$ COATED WITH $Al_2O_3+SiO_2$

| Coating | Mole Ratio $Al_2O_3:SiO_2$ | Percent Discoloration—D Calcined at 700° C. (Melamine Resin) |
| --- | --- | --- |
| 6% | 1:1 | 2.6 |
| 6% | 1:2 | 2.9 |
| 6% | 2:1 | 3.3 |
| 9% | 1:1 | 4.0 |
| 9% | 2:3 | 2.8 |
| 9% | 3:2 | 3.7 |

These data show that the lowest discoloration rating of melamine laminates is obtained wtih an oxide coating of $Al_2O_3$ and $SiO_2$ in the mole ratio of 1:1 and at 6% by weight of the $TiO_2$ pigment, the highest rating being obtained with a mole ratio of 1:1 at 9% by weight of the $TiO_2$ pigment.

From the foregoing description and example it is clear that the present invention is characterized by the discovery that pigmented resinous materials and in particular paper laminates pigmented with a $TiO_2$ pigment of the rutile modification coated with calcined alumina and silica are much more resistant to discoloration when exposed to ultraviolet light than laminates opacified with uncalcined oxide coatings.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A process for preparing a pigmented resinous material comprising the steps of: treating a calcined $TiO_2$ pigment of the rutile modification with hydrous oxides consisting of alumina and silica to form an alumina-silica coating on said pigment, the mole ratio of alumina and silica being in the range of from 1:1 to 2:1 and the amount of alumina and silica being from 2–15% by weight of the $TiO_2$, calcining said hydrous oxide coated pigment, and adding the calcined oxide coated pigment to an amine formaldehyde resin, the amine being selected from the group consisting of melamine and urea.

2. A process for preparing a pigmented resinous material comprising the steps of: treating a calcined $TiO_2$ pigment of the rutile modification with hydrous oxides consisting of alumina and silica in the mole ratio range of from 1:1 to 2:1 to form an alumina-silica coating on said pigment consisting of alumina and silica, the amount of alumina as $Al_2O_3$ after calcination being 3–7% and the amount of silica as $SiO_2$ after calcination being 1–4% by weight of said $TiO_2$, calcining said hydrous oxide coated pigment, and adding said calcined oxide coated pigment to an amine formaldehyde resin, the amine being selected from the group consisting of melamine and urea.

3. A process for preparing a pigmented resinous material comprising the steps of: treating a calcined $TiO_2$ pigment of the rutile modification with hydrous oxides consisting of alumina and silica in the ratio of 1 mole of alumina to 1 mole of silica to form an alumina-silica coating on said pigment consisting of hydrous aluminum silicate, the amount of alumina and silica present after calcination as aluminum silicate being from 2–15% by weight of said $TiO_2$, calcining said hydrous oxide coated pigment, and adding said calcined aluminum silicate coated pigment to an amine formaldehyde resin, the amine being selected from the group consisting of melamine and urea.

4. In a process for producing paper laminates wherein $TiO_2$ pigment and a resinous binder are incorporated in the paper stock from which the laminate is prepared said resinous binder being an amine formaldehyde resin selected from the group consisting of melamine and urea formaldehyde resins, the improvement comprising: incorporating in said paper stock a calcined $TiO_2$ pigment of the rutile modification characterized by a partially dehydrated $TiO_2$-free, alumina-silica coating wherein the mole ratio of alumina and silica, prior to partial dehydration is in the range of from 1:1 to 2:1 and the amount of alumina and silica is from 2–15% by weight of the $TiO_2$.

5. Process according to claim 4 wherein the alumina-silica coating consists of hydrous aluminum oxide and hydrous silicon oxide respectively, the mole ratio of said hydrous oxides being in the range of from 1:1 to 2:1 and the amount of alumina, as $Al_2O_3$, after calcination being 3–7% and the amount of silica, as $SiO_2$, after calcination being 1–4% by weight of $TiO_2$.

6. Process according to claim 4 wherein the alumina-silica coating is aluminum silicate, the mole ratio of alumina and silica being in the ratio of 1:1 and the amount of alumina and silica as aluminum silicate after calcination being from 2–15% by weight of said $TiO_2$.

7. A pigmented resinous material comprising in combination: amine formaldehyde resin, the amine being selected from the group consisting of melamine and urea, and a calcined $TiO_2$ pigment of the rutile modification having a partially dehydrated $TiO_2$-free, alumina-silica coating wherein the mole ratio of aluminum, as hydrous aluminum oxide, and silicon, as hydrous silicon oxide is in the range of from 1:1 to 2:1 and the amount of alumina and silica is from 2–15% by weight of the $TiO_2$.

8. A pigmented resinous material according to claim 7 wherein the alumina-silica coating consists of hydrous aluminum oxide and hydrous silicon oxide respectively, the mole ratio of said hydrous oxides being in the range of from 1:1 to 2:1 and the amount of alumina, as $Al_2O_3$ after calcination being 3–7% and the amount of silica as $SiO_2$ after calcination being 1–4% by weight of $TiO_2$.

9. A pigmented resinous material according to claim 7 wherein the alumina-silica coating consists of aluminum silicate the mole ratio of alumina and silica being in the ratio of 1:1 and the amount of alumina and silica is aluminum silicate after calcination being from 2–15% by weight of said $TiO_2$.

References Cited in the file of this patent

UNITED STATES PATENTS

| | | |
| --- | --- | --- |
| 2,346,188 | Robertson | Apr. 11, 1944 |
| 2,387,534 | Seidel | Oct. 23, 1945 |
| 2,399,489 | Landes | Apr. 30, 1946 |
| 2,441,225 | Pechukas | May 11, 1948 |
| 2,559,638 | Krchma | July 10, 1951 |
| 2,671,031 | Whately | Mar. 2, 1954 |
| 2,674,541 | Wainer | Apr. 6, 1954 |
| 2,739,081 | Wohnsiedler | Mar. 20, 1956 |